May 27, 1952 — F. W. SMITH — 2,598,142

MAGNETIC STEERING CONTROL

Filed June 22, 1950 — 2 SHEETS—SHEET 1

*INVENTOR.*
FREDERIC W. SMITH

BY

ATTORNEY

May 27, 1952      F. W. SMITH      2,598,142
MAGNETIC STEERING CONTROL
Filed June 22, 1950      2 SHEETS—SHEET 2
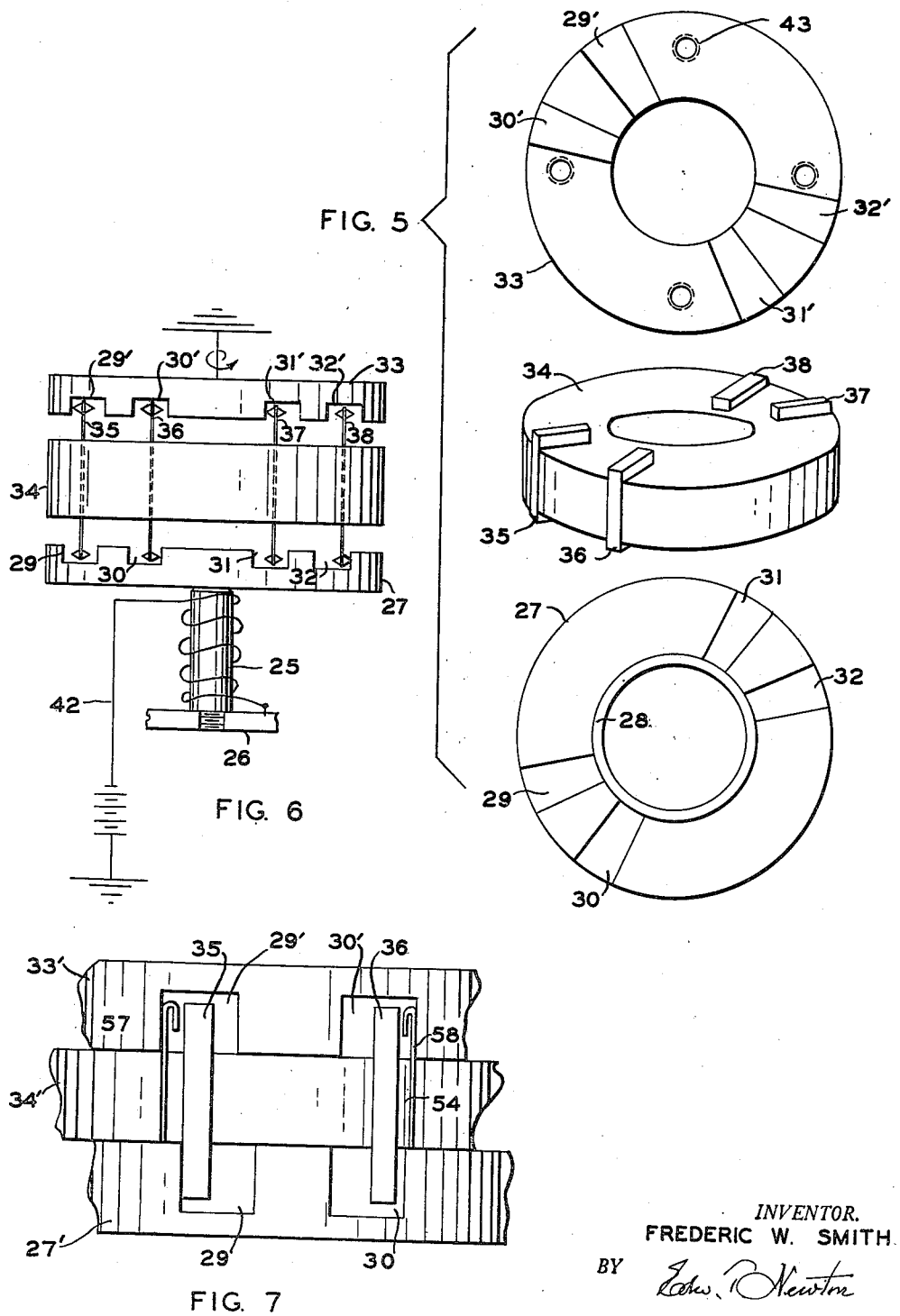
*INVENTOR.*
FREDERIC W. SMITH
BY
ATTORNEY Patented May 27, 1952

2,598,142

UNITED STATES PATENT OFFICE 2,598,142

MAGNETIC STEERING CONTROL

Frederic W. Smith, De Land, Fla.

Application June 22, 1950, Serial No. 169,758

6 Claims. (Cl. 74—495)

My invention relates to magnetic wheel controls more particularly adaptable to automobiles, trucks or any other vehicles employing a steering wheel.

It is well known that for many years the manufacturers of automotive vehicles have placed considerable effort in the design of many safety features for their several products, stressing wheel suspension, visibility, braking systems and many other items to enhance the sale of their product and to offer the public a vehicle embodying performance, safety and design. Little has been done, however, toward relieving driving fatigue caused by the constant vigil which a driver must keep over the steering mechanism to maintain his vehicle on a true course. While the vehicle may be of such design and balance as to be easily steered, a good driver knows that he must constantly keep his hands on the steering wheel lest the wheels strike some object and suddenly swerve him from his course. Fatal accidents have been known to happen by a driver lifting his hands momentarily from the steering wheel of his vehicle while passing over a railroad crossing at an oblique angle. Numerous fatalities in automobile accidents have been traced to the fact that one of the front tires blew out and caused the vehicle to swerve out of its course into a ditch or into the traffic lane of oncoming vehicles.

It is apparent, therefore, that some device or instrument which could automatically lock the steering column of a vehicle in case the wheels were suddenly turned in a direction opposite to a true course as set by the driver would be greatly advantageous and would greatly relieve driving fatigue, especially when the vehicle is to be driven for considerable distances.

It is an object of the present invention to provide a wheel control to automatically lock the wheels of a vehicle in any position at a tendency of the vehicle to change its course from the direction set by an operator.

Another object of the invention is to provide a wheel control mechanism including a series of electro-magnets cooperating with the steering column and housing of the vehicle to lock the steering column against the housing should the wheels of the vehicle tend to turn the vehicle in a direction to right or left of a course set by an operator.

Another object of the invention is to provide such a steering wheel control which is easy to manufacture and relatively simple to install.

The device is arranged for mounting inside the conventional steering column housing of the vehicle where the same will be out of sight and electrically connected to the storage battery carried by the vehicle.

Another object of the invention is to provide a steering control of the character described in which the locking action releases automatically and in which both the locking and unlocking takes place unnoticeably, without conscious effort on the part of the driver and in such a manner that the normal operation of steering remains unaffected.

A further object of the invention is to provide a steering control lock which makes driving both safer and less fatiguing, especially when the vehicle is being steered over rough terrain which tends to pull the wheels to both right and left.

Further objects and advantages of the invention will be apparent from the following detailed description taken in conjunction with the accompanying drawing in which like characters of reference designate corresponding parts throughout the several views, and wherein:

Fig. 5 is an exploded view showing the relationship of the contact rings.

Fig. 6 is a schematic diagram of the device showing particularly the electrical arrangement.

Fig. 7 is a view showing an alternate method of mounting the contacts.

Figure 1:
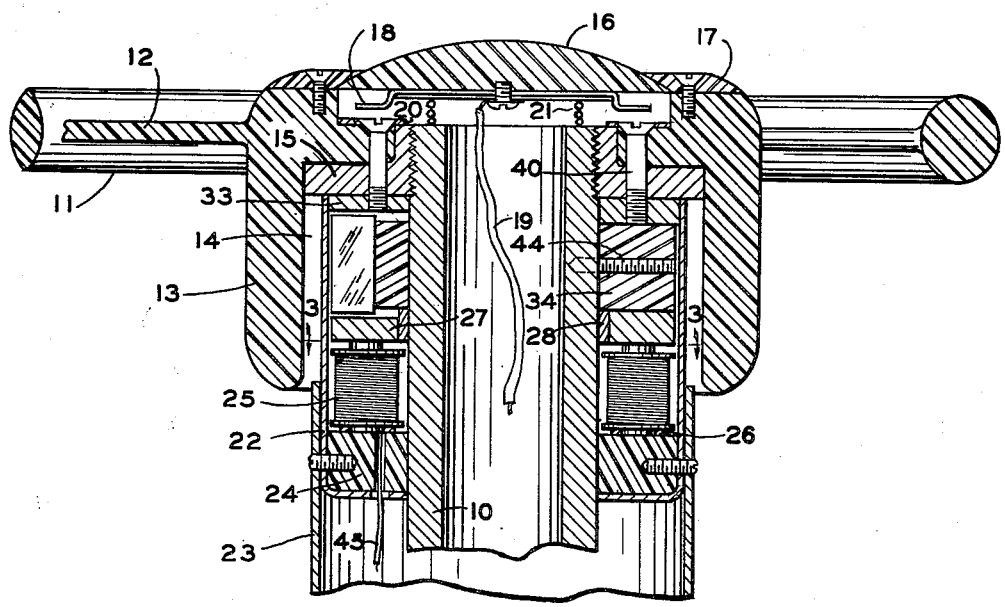
Fig. 1 is a longitudinal cross-sectional view of a device embodying my invention in a magnetic wheel control.
Figure 2:
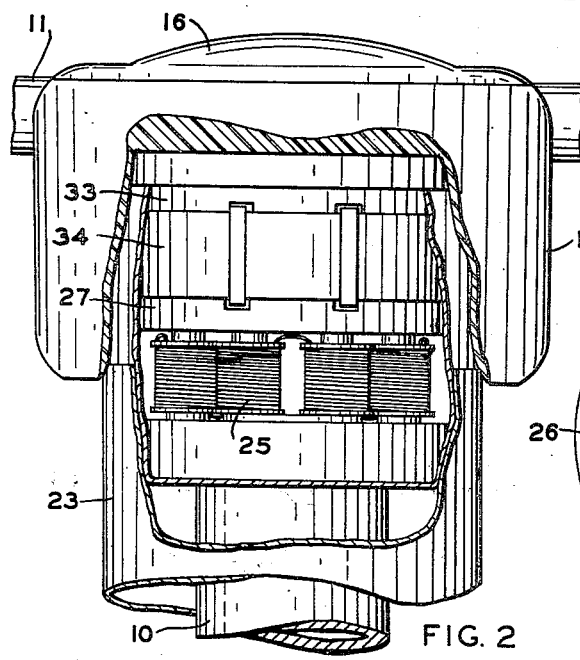
Fig. 2 is a front elevational view with parts broken away.
Figure 3:
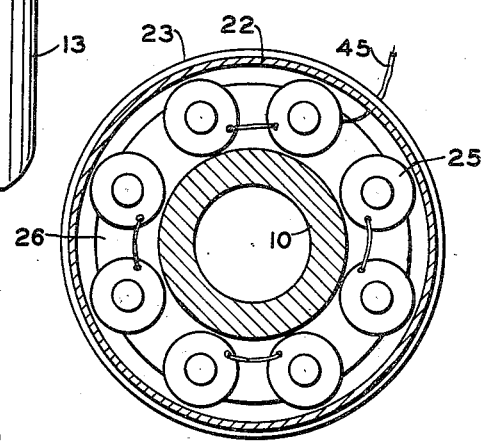
Fig. 3 is a cross-sectional view taken along lines 3—3 of Fig. 1.
Figure 4:
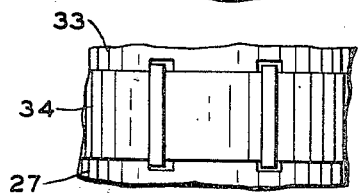
Fig. 4 is a detail view showing the method of mounting the electrical contact elements.

In the drawing, numeral 10 designates the steering column with a steering wheel 11 mounted on the upper end. The steering wheel 11 is provided with spokes 12 radiating from a central hub 13 which is made of hard rubber, pressed fabric or plastic. The hub 13 is provided with an inner counterbore 14 into which is fixed a steel flanged ring 15. The mounting ring 15 is provided with internal threads adapted to be threadedly engaged with the threaded end of the steering column 10. The ring 15 is further provided with circumferentially spaced holes through its flanged portion adapted to be positioned in alignment with the holes provided in the hub portion 13 of the steering wheel.

On the upper side of the hub 13 is the horn button 16 held in the hub by means of a removable circular ring 17. The bottom side of the horn button supports a metallic contact ring 18. Current from the battery of the vehicle is supplied to this ring over the horn wire 19 and the ring may be grounded to the steering column and the ground ring 20 by compressing the spring 21 with the horn button 16.

While the above construction illustrates one method of mounting the horn button and its electrical contacts, it is to be understood that any other method or arrangement might also be used.

In the present invention I have provided a cylinder 22 having an open top, the bottom being provided with a central hole adapted to slidably receive the steering column 10. This cylinder 22 is arranged to be slidably inserted into the steering column housing 23 and locked to the same in the manner shown in the drawing.

In the bottom of the cylinder 22 is a removably positioned ring 24 made of insulating material and arranged to rigidly support a series of electromagnets 25, the cores of which are connected to a common current carrying base plate 26. The drawing indicates a wire 41 connecting each individual base plate instead of one plate in common. The invention could be easily altered to show a common base. From the drawing it can be seen that the electro-magnets are circumferentially spaced in the annulus between the steering column 10 and the column housing 23 with the upper end surfaces of the cores lying in a smooth, horizontal plane.

Resting directly upon the upper ends of the magnet cores is a lower contact ring 27 made of iron, silicon steel or other suitable material and arranged for movement in the annulus between the steering column 10 and the column housing 23. This lower contact ring 27 is provided with an insulating ring 28 pressed into the inner hollow of the same and adapted to insulate the ring 27 from the steering column 10. It will be noted that the maximum outside diameter of the ring 27 is slightly less than the minimum diameter of the cylinder 22, so that the ring 27 will never make contact with the cylinder to cause an electrical short circuit or keep the ring from moving to perform the functions as will be described later. The ring 27 is provided with circumferentially spaced slots 29, 30, 31 and 32 cut radially and more or less diametrically opposite across the upper face thereof in the manner illustrated in Fig. 5.

I have also provided a similarly constructed upper contact ring 33 provided with slots 29', 30', 31' and 32' substantially matching the slots of the lower contact ring 27. Since this ring is arranged to provide a ground for the electrical circuit, insulation around the same is unnecessary. The ring is provided with spaced, threaded holes 43 adapted to receive studs 40, by means of which the ring is held firmly to the underside of the steering wheel mounting ring 15, so that the ring will move with every movement of the flanged ring 15.

Between the upper and lower contact rings 33 and 27 is a substantially thick insulating ring 34 made of some insulating material such as hard rubber or plastic. Positioned in slots formed on the outer face thereof are electrical contact strips 35, 36, 37 and 38 which are either pressed into their respective slots, molded in place, or otherwise affixed in a rigid, permanent manner. This insulating ring is held firmly to the steering column by means of set screws 44 and has an outside diameter small enough to permit the same to turn, free with clearance, inside the cylinder 22. From Fig. 5 it can be seen that the contacts on this ring are substantially heavy and project slightly beyond the upper and lower faces of the ring and extend for a short distance into the prepared slots in the upper and lower contact rings 33 and 27 with only the outside edges of the contacts being arranged for engagement with the side edges of the slots into which they extend. The slots are constructed with slight clearances, so that when the outside edges of diametrically opposed contacts, such as 35 and 37, are making contact with the sides of their respective slots, the other pair of contacts, with respect to the same side of the ring, will be in a neutral position, making no contact at all.

It is well to point out, now, that in the mounting of the steering wheel 11 to the column 10 by the screwing on of the flanged ring 15, the ring 15 is not screwed down for the full length of the thread where it would normally make up tight, but one or more threads are deliberately left so that there will be a slight rotative movement of the wheel, taking up the clearance between slots and contacts, before the full thrust of the turn is placed upon the contacts of the center ring 34. Since these contacts must take the torque load they must, of necessity, be made of substantial material and of a size sufficient to withstand the loads and wear to which they will be subjected.

It is now readily apparent that in the present construction the steering column 10 is made to oscillate by rotating the steering wheel in first one direction and then the other, the torque being transmitted through the upper contact ring 33, through the metal contacts 35 and 37 or 36 and 38, as the case may be, and finally through the insulating ring 34 to the steering column 10. It can also be seen by the present construction that the steering wheel 11 is permitted to turn in either direction for a short distance, because of the clearance between the slots in 33 and the contacts, before the torque is transmitted to the column as just described.

The coils of the magnets 25 are connected in series, one end of the circuit connecting to a common base plate so that commutation is provided to ring 27 through the cores, and are provided with a lead wire 45 which finally connects them to the battery with which the vehicle is supplied. The ground which completes the circuit through the coils is made by the contact strips on the center insulating ring and through the upper and lower contact rings 33 and 27 when these rings assume certain relative positions as will now be described.

For a clearer understanding of a typical example of operation of my invention, reference is now made to Fig. 6 of the drawing. Let it be assumed in this figure that the same is shown from the driver's position behind the steering wheel and that the wheel is being rotated in a direction to turn the wheels of the vehicle to the left. As long as both pressure and motion are in this direction the upper ends of contacts 35 and 37 bear the thrust of the load on the sides of their respective slots 29' and 31'. It will be remembered that the center insulating ring 34 is fixed to turn directly with the column 10, so the wheels in the present instance are actually turned by the upper ends of contacts 35 and 37.

The other slots 30' and 32' in the upper ring 33 are so positioned that the upper ends of their respective contacts 36 and 38 are held in a neutral position. Simultaneously with the turning of the wheel and upper contact ring 33 to the left, the lower ends of the contacts 36 and 38 have engaged the sides of their respective slots 30 and 32 in the lower contact ring 27 and pull this ring along in the direction of motion. It will be noted that movement in this ring 27, in the direction stated, automatically brings the lower ends of contacts 35 and 37 into a neutral position with respect to their slots 29 and 31. A turn of the wheels to the right by means of the steering wheel would simply reverse the above described movement with still no actual electrical contacts being made to energize the electro-magnets. It is readily apparent, therefore, that in a normal operation, with the steering column following the movement as directed only by operation of the steering wheel, the electro-magnets will not be energized for operation.

Let it be further assumed that, while the contacts are still in the position as shown in Fig. 6 and as described above, the wheels of the vehicle strike an object, a tire blows out, or some other circumstance suddenly arises which applies a thrust either in the same or the opposite direction to that as set by the operator of the vehicle. Such a thrust, should it be in the opposite direction would rotate the center insulating ring 34 and consequently the upper contact ring 33 to the left, the contacts 35 and 37 will remain in engagement with the sides of their respective slots as shown. Movement of these rings to the left would mean engaging the lower ends of contacts 35 and 37 with the sides of the lower slots 29 and 31 which would immediately complete an electrical circuit. Contacts 36 and 38 are now also in a neutral position with respect to their slots in ring 27. Simultaneously with the completion of the circuit, the electro-magnets would be energized to apply a magnetic field around and through the lower contact ring to prevent any subsequent movement in the same direction, the contacts 35 and 37 of the insulating ring 34 being employed to check and hold the steering column 10.

By reference to Fig. 6 it is also readily apparent that a sudden thrust of the wheels, even in the same direction of motion as applied to the steering wheel, by attempting to accelerate this motion affects the electrical circuit as above described to check such undue movement until corrected or reapplied by the driver of the vehicle.

It is important to note, also, that the steering column is at no time locked with respect to the operator of the vehicle. If the driver desires to move the wheel to the left, in opposition to the force which has just attempted to move it to the right, it is never required that the operator of the vehicle must overcome the force or holding power of the magnets in order to turn the steering wheel in any direction he so desires.

When the vehicle is traveling in a straight course upon a roadway, any sudden thrust upon the wheels either to right or left of the course being maintained by the driver, will energize the electro-magnets to check such a change in course without assistance from the driver.

Fig. 7 shows a broken view of an optional method of mounting the contacts so that the wheel will unwind after turning a corner. Leaf springs are associated with the contacts so that when the operator releases the steering wheel after turning a corner the contacts are centered with respect to the slots in the upper contact ring 33'. This centering prevents the wheel's inertia from energizing the electro-magnets (the inertia represents a force opposing the direction of motion of the wheel) and allows the wheel to return to a straight, neutral position. In Fig. 7 the contacts 35 and 36 are shown after the wheel has been released, with similar positions for the opposite contacts 37 and 38. The springs 57 and 58 are in contact with the slot sides, but because of the insulation 54 between them and the contacts no circuit can be completed. When a turning torque is applied to the wheel, however, one or the other of the springs 57 and 58 will be pushed against its corresponding contact. This permits a complete circuit to be made if necessary and the unit will operate as before. The springs make the unit slightly less sensitive in that the operator must maintain a small holding torque on the wheel equal to the torque required for closing a pair of springs against their contacts.

It is to be remembered that while the individual components described are sufficiently heavy enough to withstand the usual wear to which a steering mechanism is normally subjected, they are simple in design and compactly placed within a single cylinder. All clearance provided for the relative movements between parts is very small to insure ample space for making and breaking of the contacts with a minimum of override or backlash. In fact, the locking and unlocking of the wheel as above described is not noticeable to the driver. The device is highly advantageous when used on a vehicle being driven over a rough terrain or for long distances; and, since all swerving and weaving of the vehicle is automatically checked by my invention, the operator is subjected to less fatigue in driving.

While I have described the invention as being applicable more or less to automotive vehicles, it is to be understood that the same could as easily be applied to boats, airplanes, rotating machinery shafts, or in any place where an automatic steering or backlash control is desired.

I claim:

1. In apparatus of the class described, a rotary shaft, a rotatable control member for imparting rotary movement to said shaft, a first contact member surrounding said shaft and mounted for rotation with said control member, a second contact member, a central member through which said shaft extends surrounding said rotary shaft and fixed thereto, an electro-magnet positioned adjacent said second contact member, complementary means on said first contact member and said central member for driving said rotary shaft from said control member acting through said first contact member, and switch means for completing an electrical circuit through said electro-magnet to lock said electro-magnet and said second contact member and said central member together to stop movement imparted to said central member by said rotary shaft.

2. In apparatus of the class described, a rotary shaft, a rotatable control member for imparting rotary movement to said shaft, a first contact member surrounding said shaft and mounted for rotation with said control member, a second contact member, a central member through which said shaft extends surrounding said rotary shaft and fixed thereto, an electro-magnet positioned adjacent said second contact member, complementary means on said first contact member and said central member for driving said rotary shaft from said control member acting through said first contact member, and switch means carried by said central member for completing an electrical circuit through said electro-magnet to lock said electro-magnet and said second contact member and said central member together to stop movement imparted to said central member by said rotary shaft.

3. In apparatus of the class described, a rotary shaft, a rotatable control member for imparting rotary movement to said shaft, a first contact member surrounding said shaft and mounted for rotation with said control member, a second contact member, a central member through which said shaft extends fixed to said rotary shaft and positioned between said first contact member and said second contact member, an electro-magnet positioned adjacent said second contact member, complementary means on said first contact member and said central member for driving said rotary shaft from said control member acting through said first contact member, and switch means carried by said central member for completing an electrical circuit through said electro-magnet to lock said electro-magnet and said second contact member and said central member together to stop movement imparted to said central member by said rotary shaft.

4. In apparatus of the class described, a rotary shaft, a rotatable control member for imparting rotary movement to said shaft, a first contact member surrounding said shaft and mounted for rotation with said control member, a second contact member, a central member through which said shaft extends fixed to said rotary shaft and positioned between said first contact member and said second contact member, an electro-magnet positioned adjacent said second contact member, complementary mechanical means carried by said central member and said first contact member for driving said rotary shaft by said control member acting through said first contact member, and switch means carried by said central member and said second contact member for completing an electrical circuit through said electro-magnet to lock said electro-magnet and said second contact member and said central member together to stop movement imparted to said central member by said rotary shaft.

5. In apparatus of the class described, a rotary shaft, a control member for said shaft, a first contact member mounted for rotation with said control member, a second contact member, a central member fixed to said rotary shaft and positioned adjacent said first contact member and said second contact member, an electro-magnet positioned adjacent said second contact member, complementary mechanical means carried by said central member and said first contact member for driving said rotary shaft by said control member acting through said first contact member, resilient means positioned between said last mentioned means and said first contact member, and switch means carried by said central member and said second contact member for completing an electrical circuit through said electro-magnet to lock said electro-magnet and second contact member and said central member together to stop movement imparted to said central member by said rotary shaft.

6. In apparatus of the class described, a rotary shaft, a control member for said shaft, a first contact member mounted for rotation with said control member, a second contact member, a central member fixed to said rotary shaft and positioned intermediate said first contact member and said second contact member, an electro-magnet positioned adjacent said second contact member and upon which said second contact member rests, complementary mechanical means carried by said central member and said first contact member for driving said rotary shaft by said control member, resilient means positioned between said last mentioned means and said first contact member, and switch means carried by said central member and said second contact member for completing an electrical circuit through said electro-magnet to lock said electro-magnet and said second contact member and said central member together to stop movement imparted to said central member by said rotary shaft.

FREDERIC W. SMITH.

REFERENCES CITED

The following references are of record in the file of this patent:

UNITED STATES PATENTS

| Number | Name | Date |
| --- | --- | --- |
| 685,590 | Faltermayer | Oct. 29, 1901 |
| 1,123,404 | Sears | Jan. 5, 1915 |
| 1,447,042 | Ross | Feb. 27, 1923 |
| 1,857,897 | Vincent | May 10, 1932 |